United States Patent [19]

Hopperdietzel

[11] Patent Number: 5,096,647
[45] Date of Patent: Mar. 17, 1992

[54] METHOD FOR EXTRUDING A PLASTIC MEMBER WITH A ROUGHENED SURFACE

[75] Inventor: Siegfried Hopperdietzel, Selb, Fed. Rep. of Germany

[73] Assignee: Rehau AG & Co., Rehau, Fed. Rep. of Germany

[21] Appl. No.: 646,201

[22] Filed: Jan. 28, 1991

Related U.S. Application Data

[63] Continuation-in-part of Ser. No. 515,480, Apr. 27, 1990, and a continuation-in-part of Ser. No. 515,464, Apr. 27, 1990, abandoned.

[30] Foreign Application Priority Data

Apr. 29, 1989 [DE] Fed. Rep. of Germany ....... 3914319
Apr. 27, 1990 [DE] Fed. Rep. of Germany ....... 4016626

[51] Int. Cl.$^5$ .............................................. B29C 47/92
[52] U.S. Cl. .................................... 264/171; 264/176.1; 425/379.1; 425/380
[58] Field of Search ............... 264/176.1, 519, 209.7, 264/209.8, 210.1, 211.12, 284, 171; 425/378.1, 379.1, 380

[56] References Cited

U.S. PATENT DOCUMENTS

| | | | |
|---|---|---|---|
| 2,795,821 | 6/1957 | Williams | 264/211 |
| 2,876,497 | 3/1959 | Alexander | 264/519 |
| 2,909,810 | 10/1959 | Jensch | 264/284 |
| 3,029,474 | 4/1962 | Voigt et al. | 264/519 |
| 3,154,461 | 10/1964 | Johnson | 264/210.1 |
| 3,415,796 | 12/1968 | Souder et al. | 264/209.7 |
| 3,574,808 | 4/1971 | Matthews et al. | 264/209.8 |
| 3,920,782 | 11/1975 | Cogswell | 264/209.7 |

FOREIGN PATENT DOCUMENTS 1157245 7/1969 United Kingdom ............... 264/519

Primary Examiner—Jeffery Thurlow
Attorney, Agent, or Firm—Spencer & Frank

[57] ABSTRACT

A carrier strip for holding labels to a support, such as the edge of a shelf, includes a rear wall which can be attached to the support and a transparent front wall which is connected to the rear wall so as to form a pocket between the walls. The carrier strip is made by extruding a plastic composition at relatively high pressure through a die which imcompletely smooths the surface irregularities resulting from the relatively high extrusion pressure. This disrupts the longitudinal striations or dielines which are characteristic of extruded members and which might otherwise cause undesirable reflections when a bar code reader is used to read a bar code printed on a label in the pocket.

14 Claims, 3 Drawing Sheets

METHOD FOR EXTRUDING A PLASTIC MEMBER WITH A ROUGHENED SURFACE

CROSS-REFERENCE TO RELATED APPLICATIONS

This is a continuation-in-part of U.S. patent application Ser. No. 07/515,480 and a continuation-in-part of U.S. patent application Ser. No. 07/515,464, both filed Apr. 27th, 1990. Application Ser. No. 07/515,464 is now abandoned. Application Ser. No. 07/515,480 claims priority of Federal Republic of Germany patent application Serial Number P 39 14 319.8, filed Apr. 29th, 1989. All of these applications are incorporated herein by reference.

BACKGROUND OF THE INVENTION

The present invention relates to a method for extruding a plastic member so that the member has a surface with a fine, un-oriented roughness. The extruded member may be a carrier strip for exchangeably holding optically scannable information sheets, particularly labels with bar codes. Such a carrier strip preferably includes fastening means for fixing the carrier strip to a support such as the edge region of a shelf, container, or the like. The carrier strip has a receiving pocket formed between a rear wall and a transparent front wall. The receiving pocket accommodates the labels.

Such a holding strip is described in U.S. Pat. No. 4,295,288. In the patent, the fastening means is composed, for example, of a latch strip which may be inserted into a latch groove at the edge regions of shelves, containers, or the like. Connected in one piece with the fastening means is a covering strip for covering the edge regions of the shelves, containers, or the like as well as the rear wall and the front wall, which together form the receiving pocket for the labels. The rear wall and the front wall are connected with one another at the base, for example by way of a film hinge, and the upper edge of the rear wall grips over the free edge of the front wall in a covering manner. The front wall may be released from this retention by a slight pressure, thus causing the receiving pocket to open for the insertion of a label. Thereafter, slight pressure against the rear wall closes the receiving pocket again, with the upper edge of the rear wall snapping over the free edge of the front wall and keeping it closed.

Another carrier strip is described in European patent 203,209. This carrier strip is composed of a fastening strip and a covering strip which follows in one piece at the lower edge of the fastening strip and lies against the fastening strip. In order to insert a label or the like, this covering strip may be moved away at one side. A cover is attached to the upper edge of the fastening strip so as to project beyond the upper edge of the covering strip and serve as an arresting edge. In contrast thereto, the upper edge of the covering strip is configured as an attached latch strip which forms a snap connection with the arresting edge of the fastening strip in that it engages underneath the arresting edge. The carrier strip is made from a single piece of a polymeric material and includes a transparent covering strip which permits proper viewing and reading of the label. In contrast thereto, the fastening strip may be made of an opaque plastic and its rear face is available as a fastening surface which allows it to be glued to a shelf, for example.

The carrier strips described above are suitable for use on shelves in warehouses, storage facilities employing high shelf arrangements, and the like. The labels and the like disposed in the carrier strip ma be read by operating personnel as well as customers passing by the shelves. However, reading the labels with the scanner pen of a bar code reader is preferred in more recent shelf structures. Scanning devices such as bar code readers operate according to the reflection method, also called the direct light method. Light-emitting diodes operating primarily in the infrared region are typically employed as light sources. However, high intensity red-light diodes may also be used.

The light receiver for the bar code reader is typically a photodiode. Because the transmitting diode and the photodiode must be accommodated next to one another in a very small space, integrated systems exist which incorporate a light-emitting diode, a photodiode, a filter plate, and an amplifier for the photodiode signal. A frequently-employed system is the type HEDS-1000 sensor made by Hewlett-Packard. This sensor operates with infrared light of a wavelength of 700 nm and can be operated in a controlled or uncontrolled manner. Passage of the scanning pen of the bar code reader over a bar code on a label causes the infrared light to be received by the photodiode, with the width and the spacing of the bar codes appearing as "flickering lights" which are converted into electrical signals for electrical processing and evaluation.

Due to the high light intensity of the light-emitting diode and the fact that the photodiode is usually operated in a controlled manner in a bar code reader, no interference with operation occurs if, for example, the background of the label on which the bar code is printed fluctuates in hue within certain limits or the printing of the bar code appears in different shades of black.

Carrier strips can be made by continuously extruding plastic, such as polyvinyl chloride, through a suitably configurated die. Co-extrusion of different plastic compositions may be employed. In the extrusion process, it inevitably happens that so-called drawing scratches or dielines are produced on the surfaces of the walls of the extruded object. This includes the front wall of an extruded carrier strip. Dielines on a portion of the front wall 100 of a prior art extruded carrier strip are illustrated schematically in FIG. 5 (in which the surface irregularities have been exaggerated for illustration purposes). Dielines occur because lubricants used in the plastic composition "plate out" and form tiny lumps on the extruder die. These plated-out lumps make parallel impressions on subsequently extruded plastic. The dielines may be so slight in elevation that the human eye is barely able discern them. However, since the light-emitting diodes of scanning pens have an extremely high light intensity, the dielines on the transparent front wall of a prior art extruded carrier strip may reflect the IR light from the light-emitting diode, so that the hill-and-valley formations which together form the dielines appear to a bar code reader as additional light-to-dark transitions. Bar code readers tend to be extremely sensitive to such "false" reflected light.

In FIG. 5, rays 102 are transmitted from a scanning pen through the conventional front wall 100 to a label 104 with a bar code. However, light may also be reflected by the dielines on either the front or rear surface of wall 100, as indicated by rays 106 and 108. The dielines extend longitudinally and are parallel to one another, so in practice further rays parallel to rays 106 and 108 would be reflected in planes above and below the plane of FIG. 5. Because the dielines cause additional reflections, they give erroneous information to the bar code reader, which confuses its electronic evaluation system (not illustrated). Thus, erroneous information may be fed into the electronic evaluation system when a bar code on a label is read with a bar code scanner, thereby negating some of the value of scanning-in information.

In addition to the ingredients that are reacted and homogenized during extrusion of a plastic member the pressure and temperature of the plastic as it passes through the die play a decisive role. For example, the temperature must not be too high in order to avoid heat damage to the plastic. Furthermore the use of an inappropriate extrusion pressure may cause damage to the surface of the extruded member. It is a characteristic of the plastic extrusion process that a member formed by extruding molten plastic (also known herein as a plastic "melt") at a normal pressure has a smooth surface, albeit with dielines, but if the extrusion pressure is increased too far the surface becomes fissured. One can term this a characteristic "melt fracture" of a plastic melt that is extruded at too high a pressure. The explanation for this phenomenon may be that, with increasing pressure, elastic vibrations occur in the melt stream due to cross-sectional changes in the extrusion apparatus or due to intermittent wall adhesions, and these elastic vibrations can no longer be attenuated in the subsequent portions of the extrusions apparatus.

SUMMARY OF THE INVENTION

Therefore, it is an object of the present invention to prevent false reflections from the transparent front wall of a carrier strip when information is being read from a label in the pocket of the carrier strip using an optical scanning system, thereby preventing the transmission of false information to the scanning system by the scanning pen of a bar code reader.

Another object of the invention is to stabilize the melt fracture phenomenon during extrusion of a plastic member so that the member acquires a desired surface roughness in the micron range, instead of a fissured surface.

These objects can be attained, when a plastic member is being extruded, by subjecting the molten plastic or melt stream to increased pressure when it enters the shaping zone of the extrusion die, so that the melt fracture phenomenon occurs, and by thereafter incompletely removing the melt fracture during passage of the plastic through a short smoothing zone which follows the shaping zone in the die. If the extruded plastic member is a carrier strip, a front wall whose dielines are obliterated by an approximately uniform, unoriented roughness results. It has been found to be advantageous for the period of passage of the melt stream through the smoothing zone of the die to be a maximum of 0.07 seconds. Moreover, the increased pressure should lie between 450 and 550 bar. It is also important that the temperature of the melt stream in the shaping zone be at most 200° C. The shaping zone itself should not exceed the temperature of the melt stream, that is, a maximum 200° C.

With these processing parameters, a carrier strip can be produced that has a surface which exhibits an unoriented roughness, which can be called "microroughness." Pressure and temperature curves for the melt stream are configured according to the invention so that the melt fracture produced at the surface of the melt stream due to the increased pressure is smoothed by positive guidance in the smoothing zone of the extrusion die to such an extent that the fissured or sawtooth-like surface is returned to an oriented microroughness. In this way, carrier strips can be extruded with microroughness which avoids detrimental additional light-dark transitions when a bar code reader is used.

DESCRIPTION OF THE PREFERRED EMBODIMENT

Figure 5:
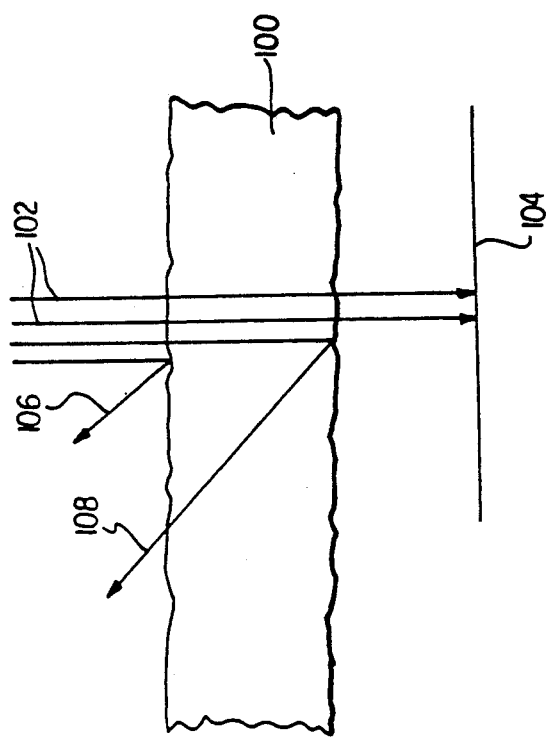
FIG. 5 is a sectional view schematically illustrating reflections at the front and rear surfaces of the front wall of a prior art carrier strip.
Figure 1:
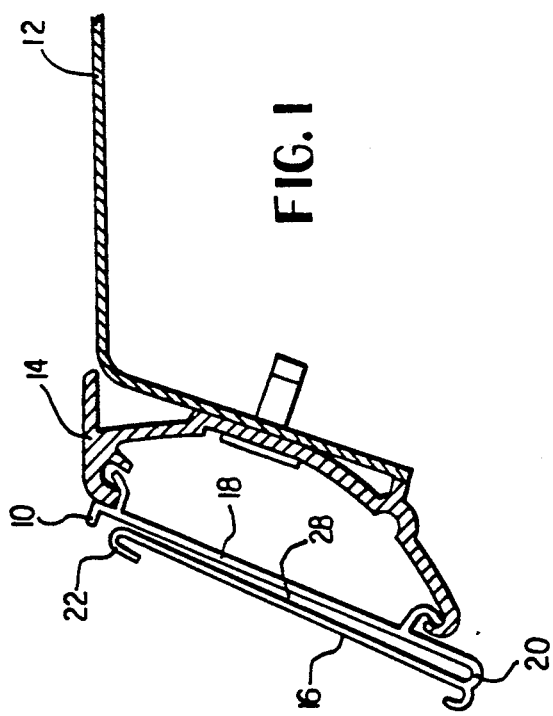
FIG. 1 is a sectional view illustrating an example of a carrier strip with an anti-reflection front wall made in accordance with the present invention.

While extruded plastic members which incorporate the features of the invention may take various physical forms, the invention is particularly adapted for making carrier strips which hold exchangeable information carriers. One such carrier strip is described in U.S. patent application Ser. No. 07/427,886, filed Oct. 30th, 1989, now abandoned, the entire disclosure of which is hereby incorporated by reference. A carrier strip 10 having the configuration disclosed in the above-noted application is illustrated in FIG. 1. As shown, carrier strip 10 is attached to a grocery store shelf 12 for supporting cans, boxes, or other products (not illustrated) by means of an elongated molding member 14.

Carrier strip 10 is produced by a co-extrusion process (such as the one illustrated diagrammatically in FIG. 4, which will be discussed in more detail later) in which a transparent front wall 16 is extruded in one piece together with a non-transparent rear wall 18 in such a way that front wall 16 is connected with rear wall 18 at one longitudinal edge 20, while the other longitudinal edge 22 remains unconnected to rear wall 18. The overall height of carrier strip 10 is about 34.5 mm. Front wall 16 is very thin (about 0.65 mm). Rear wall 18 is slightly thicker, about 0.85 mm.

Figure 3:
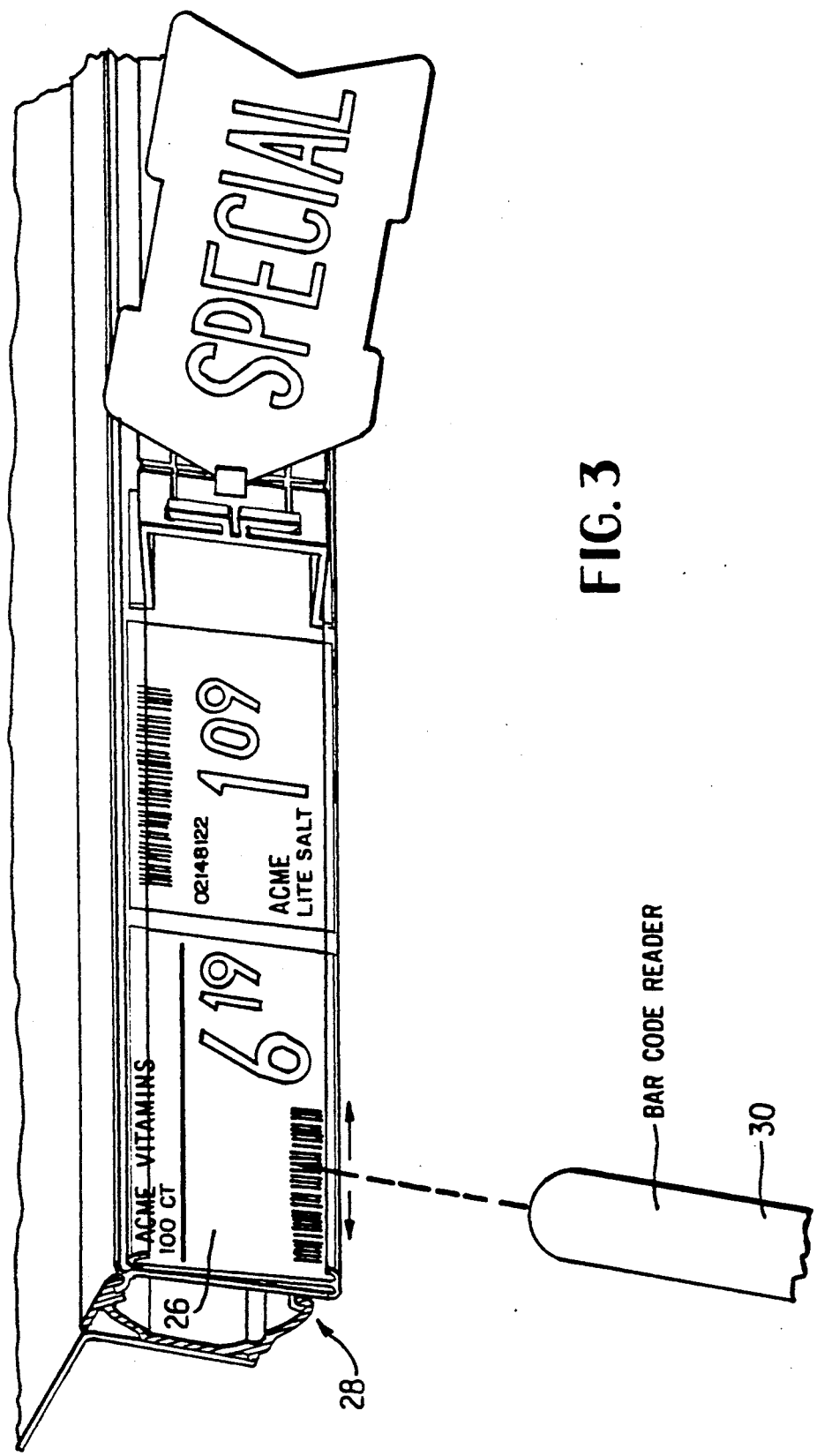
FIG. 3 is a perspective view illustrating the use of a bar code reader to read a label in the pocket of the carrier strip shown in FIG. 1.

Front wall 16 may be bent away from rear wall 18. A scannable label 26 ca then be inserted into the receiving pocket 28 between front wall 16 and rear wall 18 as illustrated in FIG. 3. Then, as a result of the tensions generated during its bending away, front wall 16 returns to the rear wall 18 and the label 26 is enclosed in receiving pocket 28. Due to the transparency of front wall 16, label 26 is visible to the human eye or the scanning pen 30 of a bar code reader.

As was noted above in the "Background of the Invention" section, parallel longitudinal dielines are normally produced during the extrusion process, and such dielines may contribute to mis-reads when a bar code reader is employed by causing spurious reflections. An optically smooth surface cannot be produced by extrusion. The present invention minimizes reflections by equalizing the dielines in such a way that the transmission of false information to the electronic evaluation system of a bar code reader is avoided. In the present invention the longitudinal dielines produced on the surface of the front wall during extrusion are equalized by an unoriented roughnesses of approximately the same depth, so that an optically uniformly rough surface results.

This approximately uniform and unoriented roughness reduces, or excludes completely, the undesirable abrupt fluctuations between light and dark sensed by a bar code reader due to longitudinal dielines. The surface of the front wall of the carrier strip thus prevents false reflections which provide false information to the bar code reader. The damaging light-dark transitions due to extrusion dielines are thus prevented from occurring.

Figure 2:
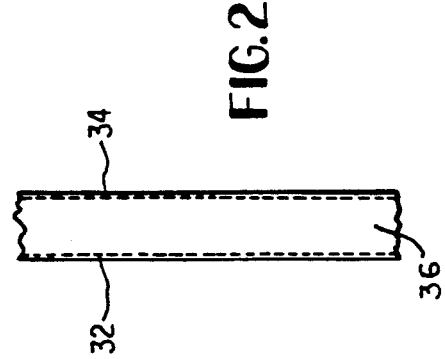
FIG. 2 is a magnified sectional view schematically illustrating a portion of the front wall of the carrier strip shown in FIG. 1.

The uniform, unoriented roughness of the transparent front wall according to the invention is limited to the regions 32 and 34 immediately adjacent the front and rear surfaces, as is illustrated in exaggerated form by the dotted lines in FIG. 2. The surfaces appear slightly rough and milky, while core 36 of front wall 16 remains clear as glass. In this way, no damaging light reflections may occur through core 36 of front wall 16. The unoriented roughness at the front and rear surfaces according to the invention therefore ensures that no undesirable reflections may emanate from either surface. The light beam from the scanning pen 30 of the bar code reader may thus penetrate to bar code 38 of inserted label 26 without being interfered with by undesirable ancillary reflections. Therefore, the information encoded by the bar code on label 26 reaches the electronic evaluation system (not illustrates) without any negative side effects and may be processed there accordingly.

The unoriented roughness on the surface of transparent front wall 16 may be called "microroughness." The microroughness may be obtained, for example, by employing a composition in the production of front wall 16 which has components whose amounts are particularly adjusted depending on the lubricant used and which, in conjunction with the period of dwell of the melt in the parallel discharge portion or smoothing zone of the co-extrusion die, lead to the unoriented roughness.

A suitable plastic composition for forming the front wall 16 may include the following ingredients:
- 100 parts by weight polyvinyl chloride having a K value of 57 as the base plastic;
- 2 parts by weight of a tin stabilizer;
- 1.5 parts by weight polymethyl methacrylate as a flow modifier; and
- 1.2 parts by weight of a lubricant mixture of fatty alcohols, wax esters, and oxidized polyethylene.

This composition is reacted in an extruder under the influence of heat and screw friction, with the extrusion being conducted at a high pressure and with the period of dwell of the melt in the parallel discharge or smoothing zone of the coextrusion die being between 0.04 and 0.07 seconds.

With this composition and period of dwell in the smoothing zone of the die, it is possible to obtain a surface in which the depth of the roughness of the surface is approximately the same in the longitudinal direction and in the transverse direction. The difference between these roughness depths in the longitudinal and transverse directions is less than 3.0 $\mu$m. The latter is important for the purposes of the present invention, because tests have shown that a greater roughness depth difference would again produce light-dark transitions and thus undesirable reflections.

Figure 4:
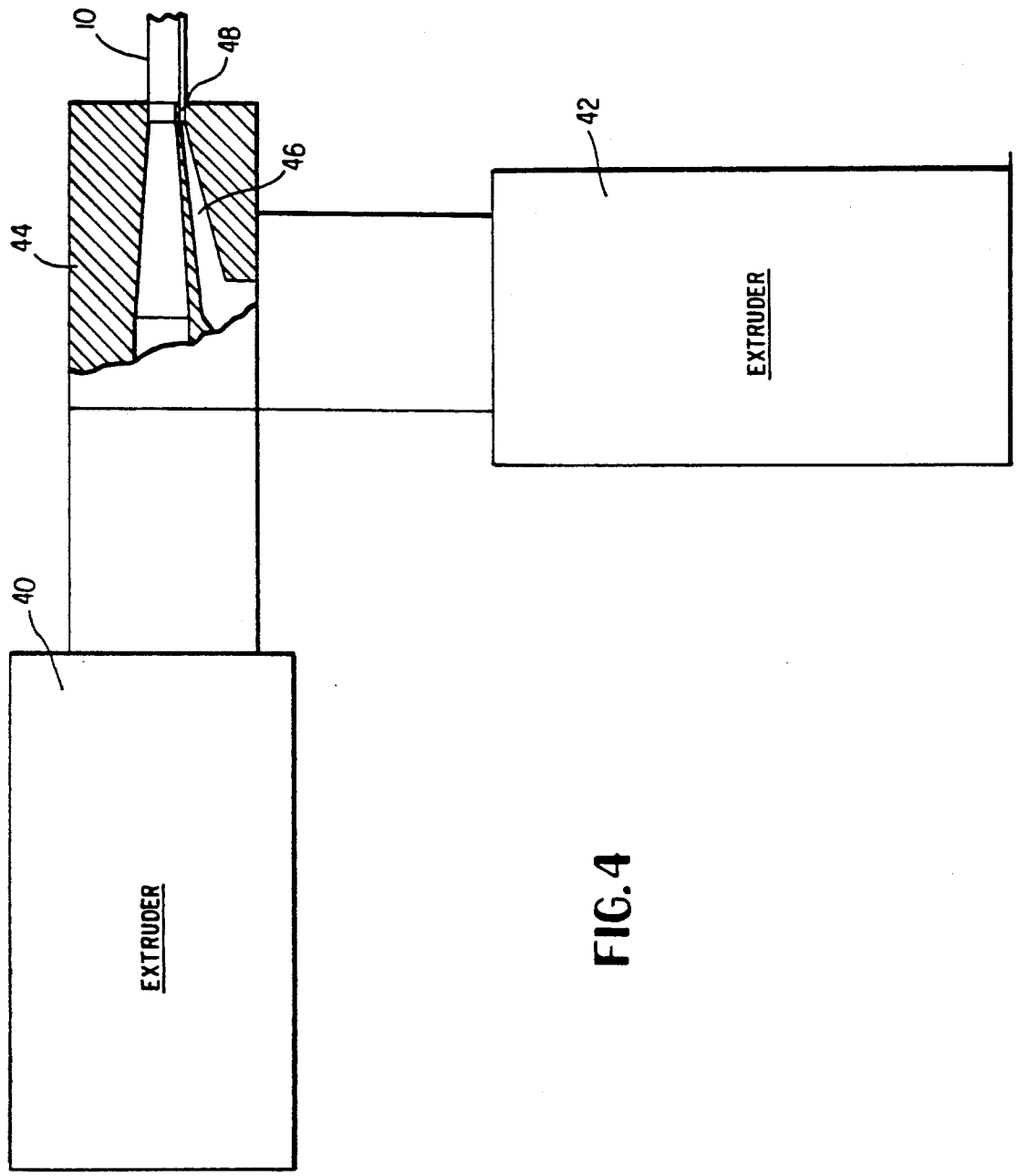
FIG. 4 illustrates a process for making a carrier strip according to the invention in diagrammatic form.

A co-extrusion process according to the invention for making a member such as a carrier strip is illustrated in FIG. 4 in diagrammatic form. While the extruded carrier strip shown in FIG. 4 is identified by reference number 10, this ha been done merely for the sake of convenient description since the invention is not limited to extrusion of carrier strips having the geometrical form shown in FIG. 1 for strip 10. A first extruder 40 which is heated to a temperature of around 185-200° C. is used to extrude the plastic for the back wall 18 of the carrier strip 10 while a second extruder 42 is used to extrude the transparent plastic for the front wall 16 of the carrier strip 10. Extruders 40 and 42 both feed into a co-extrusion die 44, which is preferably maintained at a temperature lower than 200° C., most preferably around 180° C. The plastic melt from extruder 42 is re-routed at a right angle in die 44, so that it flows in the same direction as the melt stream from extruder 40, and is conveyed through a shaping zone 46 and then through a smoothing zone 48. Shaping zone 46 has a wide entry region as shown, and then narrows constantly in the direction toward smoothing zone 48 so that the build-up of pressure in the conveyed plastic melt can be constant. The length of the shaping zone 46 depends on the thickness selected for front wall 16. The extrusion of front wall 16 is conducted at a relatively high pressure of around 450-550 bar. At such pressures the previously-described "melt fracture" phenomenon occurs because the molten plastic or melt is subjected to undamped elastic fluctuations due to cross-sectional changes along the extrusion path or due to intermittent wall adhesion in the melt flow. The melt fracture would cause front wall 16 to have a fissured surface were it not partially smoothed out—but only to the extent that the inevitable dielines are disrupted—by smoothing zone 48. While die 44 must be kept at a temperature which will allow plastic to flow through the die 44, it is desirable that it be maintained at a cooler temperature than the plastic from extruder 42, so that the unoriented microroughness of the transparent plastic will be augmented.

Particularly important for the invention is the length of the smoothing zone 48 at the outlet of the shaping zone 46, since the surface of the resulting front wall 16 and its microroughness can be influenced directly on this parallel guided path.

However, just as important is the increased pressure to which the melt is subjected when it enters the shaping zone 46, since this increased pressure directly influences the extent of the resulting melt fracture in the surface of the melt stream. The molten plastic or melt should pass through the parallel smoothing zone 48 in a maximum of 0.07 seconds if the pressure of the melt stream has been increased to 450 to 550 bar upon entrance into the shaping zone 46. Under these conditions, the desired microroughness is realized by an optimum relationship between the resulting melt fracture and the incomplete smoothing in the subsequent smoothing zone 48.

The invention will now be described in greater detail with reference to the following examples:

EXAMPLE 1

A transparent strip was extruded to a wall thickness of 0.5 mm at an extrusion rate of 9 m/min. The smoothing zone 48 of the extrusion die had a length of 6 mm.

The period of dwell of the melt in smoothing zone 48 was about 0.04 seconds. A pressure of 520 bar was measured at the inlet of the shaping zone 46. The surface of the extruded strip had approximately the same roughness depth in the longitudinal and transverse directions.

EXAMPLE 2

A strip was extruded to a wall thickness of 0.65 mm. Due to the greater wall thickness than in Example 1, the extrusion rate was 7.5 m/min.

The smoothing zone 48 at the outlet of the shaping zone 46 had a length of 5 mm. The period of swell of the melt in the smoothing zone was about 0.04 seconds. A pressure of about 450 bar was measured at the inlet of the shaping zone 46. In this case as well, an optimum strip surface was realized in that it had approximately the same roughness depth in the longitudinal and transverse directions.

EXAMPLE 3

A strip was extruded to a wall thickness of 0.8 mm. Due to this thickness, an extrusion rate of 4.8 m/min was realized. The smoothing zone 48 at the outlet of the shaping zone 46 had a length of 4.5 mm. This resulted in a period of dell of the melt in the smoothing zone 48 of about 0.056 seconds. A pressure of more than 450 bar was measured at the inlet of the shaping zone 46. Optimum scanner readability was noted in this case as well.

The above Examples show clearly that with increased pressure at the inlet of the shaping zone 46 and a short parallel (i.e., extending parallel to the extruded strip) smoothing zone 48 at its outlet, and with a correspondingly adjusted plastic composition, it is possible to produce a front wall 16 by extrusion which is optimally suited for use with a bar code reader.

One suitable composition for forming front wall 16 was described above. Another suitable composition, which is particularly useful for impact-resistant carrier strips which are to be used in refrigerated areas, is as follows:
- 100 parts by weight polyvinyl chloride having a K value of 57 as the base plastic;
- 2 parts by weight of tin stabilizer;
- 6 parts by weight of methacrylate butadiene styrol polymer (MBS polymer);
- 1.5 parts by weight polymethyl methacrylate flow modifier;
- 1.4 parts by weight of a lubricant mixture composed of fatty alcohols, wax esters, and oxidized polyethylene A further suitable composition for forming front wall 16 is as follows:
- 100 parts by weight of suspension PVC having a K value of 58;
- 2.2 parts by weight of tin stabilizer;
- 1.5 parts by weight of polymethyl methacrylate flow modifier;
- 1.4 parts by weight of a lubricant mixture of fatty alcohol, wax esters, and oxidized polyethylene.

For good results, the polyvinyl chloride used as a base plastic preferably has a K value no greater than 62 for good extrudability. The smaller the K value, the smaller the molecular weight, and a small molecular weight facilitates extrusion through the thin aperture (not illustrated) of die 44 which produces front wall 16.

The tin stabilizer is used for heat stabilization of the polyvinyl chloride during the extrusion process. Other metal heat stabilizers may be used if they do not materially interfere with the transparency of the plastic. Such heat stabilizers include cadmium, zinc, and calcium stabilizers. However, tin stabilizers such as butyl-tin, octyl-tin and methyl-tin are the preferred heat stabilizers, because they don't produce undesirable clouding in the polyvinyl chloride and because of their environmental advantages. Preferably the tin stabilizer comprises between about 1.0 and 4.0 parts by weight of the entire composition.

The lubricant mixture may be various combinations of of fatty alcohols, wax esters, and oxidized polyethylene which act as "internal" and "external" lubricants. That is, they increase the internal flowability of the plastic base material and lubricate the composition with respect to the extrusion machinery. Preferably, the lubricant mixture comprises between 0.5 and 2.0 parts by weight of the entire composition.

Tests have shown that with carrier strips having the features of the invention, light impinging perpendicularly onto the surface of the transparent front wall is uniformly scattered in all directions. As a typical measured value transversely and longitudinally to the direction of the beam from the light source, a difference of less than 2% deviation of the light beam was measured. This order of magnitude is negligible since it provides no undesirable reflections because of additional light-dark transitions and thus no false reflections to the photodiode of a bar code reader. If the surfaces of the transparent front wall do not included the unoriented roughness of the invention, differences in scattered light up to 25% were measured. Such values correspond to a difference in roughness depth of approximately 4.5 $\mu$m and are known to produce the undesirable reflections of light which give false information to the electronic evaluation system via the scanning pen.

The microroughness according to the invention may also be produced mechanically on the front surface of the front wall of the carrier strip. Grinding, sand-blasting, and other known methods may be used for this purpose.

It will be understood that the above description of the present invention is susceptible to various modifications, changes, and adaptations, and the same are intended to be comprehended within the meaning and range of equivalents of the appended claims.

What I claim is:

1. A method of continuously producing an elongated member of glass-clear polyvinyl chloride from starting materials, comprising the steps of:
   (a) mixing and heating the starting materials in an extruder to form a homogeneous melt;
   (b) conveying the melt from the extruder to a die having a shaping zone and a smoothing zone which follows the shaping zone;
   (c) subjecting the melt entering the shaping zone of the die to pressure high enough to produce melt fracture; and
   (d) incompletely removing the melt fracture during passage through the smoothing zone of the die so as to provide the member with surface roughness, the surface roughness being of approximately uniform depth in the longitudinal and transverse directions of the member.

2. The method of claim 1, wherein step (d) is conducted in such a manner that the period of passage of the melt through the smoothing zone of the die is, at most, about 0.07 seconds.

3. The method of claim 1, wherein step (c) comprises subjecting the melt entering the shaping zone of the die to a pressure between about 450 bar and about 550 bar.

4. The method of claim 1, further comprising the step of keeping the melt in the shaping zone of the die at a temperature that is, at most, about 200° C.

5. The method of claim 4, wherein the temperature of the die at the shaping zone does not exceed the temperature of the melt.

6. A method for making a carrier strip having a rear wall, a transparent front wall, and a pocket between the walls for receiving a label, said method comprising the steps of:
   (a) conveying molten plastic for forming the rear wall to a co-extrusion die, the die having a first passage for the plastic forming the rear wall;
   (b) conveying molten plastic for the front wall to the die, the die having a second passage for the plastic forming the front wall, the second passage including a shaping zone and a smoothing zone which follows the shaping zone;
   (c) maintaining the plastic in the shaping zone of the second passage at a pressure high enough to produce fissures in the surface of the plastic; and
   (d) incompletely smoothing the fissures, as the plastic passes through the smoothing zone of the second passage, to provide the front wall with a microroughened surface which reduces reading errors when a bar code on a label in the pocket is read through the front wall using a bar code reader.

7. The method of claim 6, wherein step (c) comprises subjecting the plastic in the smoothing zone of the second passage to pressure of more than about 450 bar.

8. The method of claim 7, wherein the molten plastic for the front wall has a predetermined temperature as it enters the second passage of the die, and further comprising the step of maintaining the die at a temperature that is less than the predetermined temperature.

9. The method of claim 8, wherein the step of maintaining the die at a temperature that is less than the predetermined temperature is conducted by maintaining the die at a temperature lower than about 185° C.

10. The method of claim 6, wherein step (b) is conducted using a plastic composition having PVC as its primary ingredient.

11. The method of claim 6, wherein the microroughened surface of the front wall has variations in depth that are approximately uniform in the longitudinal and transverse directions of the carrier strip.

12. The method of ;claim 6, wherein the period of passage of the molten plastic through the smoothing zone of the second passage during step (d) is, at most, about 0.07 seconds.

13. The method of claim 1, wherein the member comprises a front wall of a carrier strip for labels, the carrier strip additionally having means for supporting a label behind the front wall, the surface roughness reducing reading errors when a bar code on a label is read through the front wall using a bar code reader.

14. The method of claim 13, wherein the means for supporting a label behind the front wall comprises a rear wall which is connected to the front wall to provide a pocket between the walls, the pocket receiving the label, and further comprising the steps of mixing and heating plastic starting materials for the rear wall in another extruder to form another melt, conveying the another melt to the die, and co-extruding the another melt along with the melt.

* * * * *